(12) United States Patent
Trompen et al.

(10) Patent No.: US 7,954,457 B2
(45) Date of Patent: Jun. 7, 2011

(54) DISPENSER

(75) Inventors: Mick A. Trompen, Westfield, IN (US);
Gregory A. Lyon, Indianapolis, IN (US);
Jeffery A. Meyer, Greenfield, IN (US)

(73) Assignees: Aircom Manufacturing, Inc.,
Indianapolis, IN (US); Eli Lilly and Company, Indianapolis, IN (US)

( * ) Notice: Subject to any disclaimer, the term of this patent is extended or adjusted under 35 U.S.C. 154(b) by 1250 days.

(21) Appl. No.: 11/226,478

(22) Filed: Sep. 14, 2005

(65) Prior Publication Data

US 2007/0057085 A1    Mar. 15, 2007

(51) Int. Cl.
*A01K 13/00* (2006.01)
(52) U.S. Cl. .......................................... 119/655; 119/860
(58) Field of Classification Search .................. 119/602, 119/603, 652, 660–662, 860, 655
See application file for complete search history.

(56) References Cited

U.S. PATENT DOCUMENTS

| | | |
|---|---|---|
| 3,465,724 A | 9/1969 | Broadbent |
| 3,541,995 A | 11/1970 | Fathauer |
| 3,756,200 A | 9/1973 | Ohlhausen |
| 3,781,837 A | 12/1973 | Anderson et al. |
| 3,840,009 A | 10/1974 | Michaels et al. |
| 3,893,111 A | 7/1975 | Cotter |
| 3,902,084 A | 8/1975 | May |
| 3,929,277 A | 12/1975 | Byrne et al. |
| 3,935,839 A | 2/1976 | Goodwin |
| 3,941,283 A | 3/1976 | Garbe |
| 3,949,708 A | 4/1976 | Meeks |
| 4,023,532 A * | 5/1977 | Goodwin ...................... 119/655 |
| 4,184,453 A | 1/1980 | Ritchey |
| 4,225,578 A | 9/1980 | von Bittera et al. |
| 4,286,005 A | 8/1981 | Berger |
| 4,354,889 A | 10/1982 | Berger |
| 4,359,015 A | 11/1982 | Ritchey |
| 4,366,777 A | 1/1983 | Akhavein et al. |
| 4,381,782 A | 5/1983 | Mazurak et al. |
| 4,399,821 A | 8/1983 | Bowers |
| 4,425,117 A | 1/1984 | Hugemann et al. |
| 4,425,874 A | 1/1984 | Child |

(Continued)

FOREIGN PATENT DOCUMENTS

EP    0 140 558 A2    5/1985

(Continued)

OTHER PUBLICATIONS

The Veterinary Journal, vol. 161, No. 3, May 2001.

(Continued)

*Primary Examiner* — Rob Swiatek
*Assistant Examiner* — Valentina Xavier
(74) *Attorney, Agent, or Firm* — Bose McKinney & Evans LLP (57) ABSTRACT

A dispenser that delivers a small but consistent and sustained amount of fluid over an extended period of time, particularly useful but not limited to dispensing pesticides when worn by cattle. The dispenser has a shell having an opening. A reservoir is disposed in the shell and is saturated with a pesticide. A wick is in fluid communication with the reservoir. The wick extends through the opening and has a greater capillary attraction or wicking ability than the reservoir, whereby during use of the dispenser the wick draws fluid from the reservoir and deposits it upon contact.

53 Claims, 11 Drawing Sheets

U.S. PATENT DOCUMENTS

| | | | |
|---|---|---|---|
| 4,428,327 A | | 1/1984 | Steckel |
| 4,495,898 A | | 1/1985 | Akhavein et al. |
| 4,506,630 A | * | 3/1985 | Hair .................. 119/654 |
| RE31,940 E | | 7/1985 | Ritchey |
| 4,532,530 A | | 7/1985 | Hawkins |
| 4,532,892 A | | 8/1985 | Kuzara |
| 4,543,247 A | | 9/1985 | von Bittera et al. |
| 4,544,547 A | | 10/1985 | Von Bittera et al. |
| 4,562,794 A | | 1/1986 | Speckman |
| 4,579,085 A | | 4/1986 | McGuire |
| 4,596,575 A | | 6/1986 | Rosenberg et al. |
| 4,606,478 A | | 8/1986 | Hack et al. |
| 4,612,877 A | | 9/1986 | Hayes |
| 4,617,876 A | | 10/1986 | Hayes |
| 4,674,445 A | | 6/1987 | Cannelongo |
| 4,694,781 A | | 9/1987 | Howe et al. |
| 4,697,549 A | | 10/1987 | Hair |
| 4,718,374 A | | 1/1988 | Hayes |
| 4,721,064 A | | 1/1988 | Denk et al. |
| 4,748,939 A | * | 6/1988 | Cocke et al. .................. 119/660 |
| 4,750,284 A | | 6/1988 | Parry et al. |
| 4,854,328 A | | 8/1989 | Pollack |
| 4,865,044 A | | 9/1989 | Wallace et al. |
| 4,870,926 A | * | 10/1989 | Smith .................. 119/658 |
| 4,890,580 A | | 1/1990 | Owen et al. |
| 4,930,451 A | * | 6/1990 | Miller et al. .................. 119/654 |
| 4,944,659 A | | 7/1990 | Labbe et al. |
| 5,044,114 A | | 9/1991 | Haberer |
| 5,046,453 A | | 9/1991 | Vinci |
| 5,074,252 A | * | 12/1991 | Morgan, Jr. .................. 119/654 |
| 5,167,625 A | | 12/1992 | Jacobsen et al. |
| 5,190,220 A | | 3/1993 | Bolton |
| 5,318,557 A | | 6/1994 | Gross |
| 5,429,606 A | | 7/1995 | Robinson et al. |
| 5,582,593 A | | 12/1996 | Hultman |
| 5,618,269 A | | 4/1997 | Jacobsen et al. |
| 5,620,696 A | | 4/1997 | Krzewki et al. |
| 5,750,514 A | | 5/1998 | Meyer |
| 5,823,989 A | | 10/1998 | Ostrow |
| 5,894,841 A | | 4/1999 | Voges |
| 5,932,204 A | | 8/1999 | Joshi |
| 5,980,496 A | | 11/1999 | Jacobsen et al. |
| 6,056,734 A | | 5/2000 | Jacobsen et al. |
| 6,109,539 A | | 8/2000 | Joshi et al. |
| 6,113,539 A | | 9/2000 | Ridenour |
| 6,283,065 B1 | | 9/2001 | Shorrock et al. |
| 6,293,474 B1 | | 9/2001 | Helf et al. |
| 6,296,196 B1 | | 10/2001 | Denen et al. |
| 6,339,897 B1 | | 1/2002 | Hayes et al. |
| 6,341,732 B1 | | 1/2002 | Martin et al. |
| 6,367,925 B1 | | 4/2002 | Chen et al. |
| 6,375,649 B1 | | 4/2002 | Jellie |
| 6,378,780 B1 | | 4/2002 | Martens, III et al. |
| 6,382,522 B2 | | 5/2002 | Tomkins et al. |
| 6,386,462 B1 | | 5/2002 | Martens, III |
| 6,419,163 B1 | | 7/2002 | Joshi et al. |
| 6,436,069 B1 | | 8/2002 | Jellie |
| 6,439,474 B2 | | 8/2002 | Denen |
| 6,446,880 B1 | | 9/2002 | Schram et al. |
| 6,450,419 B1 | | 9/2002 | Martens, III et al. |
| 6,482,863 B2 | | 11/2002 | Munagavalasa et al. |
| 6,543,389 B2 | | 4/2003 | Hedde |
| 6,588,376 B1 | | 7/2003 | Groh |
| 6,664,897 B2 | | 12/2003 | Pape et al. |
| 6,668,760 B2 | | 12/2003 | Groh et al. |
| 6,669,682 B1 | | 12/2003 | Gibson et al. |
| 6,758,000 B2 | | 7/2004 | Sandt et al. |
| 6,786,427 B2 | | 9/2004 | Schram et al. |
| 6,789,741 B2 | | 9/2004 | Varanasi et al. |
| 6,793,149 B2 | | 9/2004 | Schram et al. |
| 6,800,070 B2 | | 10/2004 | Mazidji et al. |
| 6,835,386 B2 | | 12/2004 | Gutierrez |
| 6,843,430 B2 | | 1/2005 | Boticki et al. |
| 6,857,580 B2 | | 2/2005 | Walter et al. |
| 6,879,693 B2 | | 4/2005 | Miller et al. |
| 6,923,383 B1 | | 8/2005 | Joshi et al. |
| 6,962,579 B2 | | 11/2005 | Jellie |
| 7,387,216 B1 | * | 6/2008 | Smith .................. 220/254.3 |
| 2001/0020317 A1 | | 9/2001 | Heisig et al. |
| 2001/0050317 A1 | | 12/2001 | Denen |
| 2002/0087120 A1 | | 7/2002 | Rogers et al. |
| 2002/0088154 A1 | | 7/2002 | Sandt et al. |
| 2002/0158156 A1 | | 10/2002 | Joshi et al. |
| 2002/0192255 A1 | | 12/2002 | Schiavo et al. |
| 2003/0062001 A1 | | 4/2003 | Andersson |
| 2003/0212386 A1 | | 11/2003 | Trompen et al. |
| 2004/0161282 A1 | | 8/2004 | Bolton |
| 2004/0199116 A1 | | 10/2004 | Trompen et al. |
| 2005/0025979 A1 | | 2/2005 | Sandt et al. |
| 2005/0145187 A1 | | 7/2005 | Gray |
| 2006/0037557 A1 | | 2/2006 | Gordon |
| 2008/0245314 A1 | * | 10/2008 | Brodowski et al. .......... 119/651 |

FOREIGN PATENT DOCUMENTS

| | | |
|---|---|---|
| JP | 5065879 | 3/1993 |
| WO | WO 88/05314 | 7/1988 |
| WO | WO 98/01023 | 1/1998 |
| WO | WO 02/16048 | 2/2002 |
| WO | WO 03/028797 | 4/2003 |
| WO | WO 2004/066720 | 8/2004 |
| WO | WO 2004/089238 | 10/2004 |

OTHER PUBLICATIONS

Israel Journal of Veterinary Medicine, vol. 58, No. 2/3, 2003.
The Indian Veterinary Journal, vol. 76, No. 2, Feb. 1999.
Australian Veterinary Journal, vol. 76, No. 9, Sep. 1998.
The Indian Veterinary Journal, vol. 81, No. 2, Feb. 2004.
Veterinary Parasitology, vol. 82, No. 4, May 1999.
Cattle Practice, vol. 5, Part 4, BCVA 1997.
The Journal of Veterinary Medicine Science, vol. 61, No. 3, Mar. 1999.
Filtrona Fibertec Website printout—Cellulose Acetate Reservoirs, (printed May 9, 2006)— 1 page, http://www.filtronafibertec.com/BondedFiberComponents/3b56fa77-7f03-4aed-bcb5-c98a91ce33a6.htm.
Taylor, M.A., Recent Developments in Ectoparasiticides, The Veterinary Journal, vol. 161, No. 3, May 2001, pp. 253-268.
Pipano, E., Israel Journal of Veterinary Medicine, vol. 58, No. 2/3, 2003, pp. 39-45.
Bhushan, C., Evaluation of the Efficacy of Flumethrin (Bayticol®) Pour-On Against Cattle Ticks in India Under Field Conditions, The Indian Veterinary Journal, vol, 76, No. 2, Feb. 1999, pp. 94-96.
Rothwell, J.T., Efficacy of zeta-cypermethrin as pour-on or spray formulations for the control of buffalo fly (*Haematobia irritans exigua*) in cattle, Australian Veterinary Journal, vol. 76, No. 9, Sep. 1998, pp. 610-612.
Dharmaraj, Benzene Hexachloride Toxicity in a Buffalo Calf—A Case Report, The Indian Veterinary Journal, vol. 81, No. 2, Feb. 2004, pp. 86-87.
Molento, M.B., Persistent efficacy of doramectin pour-on against artificially induced infections of nematodes in cattle, Veterinary Parasitology, vol. 82, No. 4, May 1999, pp. 297-303.
Taylor, M.A., Treatment and Control of Ectoparasites of Cattle, Cattle Practice, vol. 5, Part 4, BCVA 1997, pp. 279-282.
Uzuka, Y., Chemical Control of *Haematobia* irritans with 0.5% Topical Ivermectin Solution in Cattle, The Journal of Veterinary Medicine Science, vol. 61, No. 3, Mar. 1999, pp. 287-289.

* cited by examiner

DISPENSER

FIELD OF THE INVENTION

The present invention relates to fluid delivery and more particularly to a dispenser for delivering fluid over extended periods of time.

BACKGROUND

There are various methods used to control pests on large domestic animals such as livestock. Commonly employed methods include sprays and dusts, back rubbers and dust bags, and ear tags or tapes.

Sprays, dusts, and pour-on applications of pesticide involve manually applying pesticide to the animal's back. Although this method can be effective, it requires additional herding and handling and is generally not practical for large ranches or for free-range cattle.

Back rubbers and dust bags are devices that are impregnated or filled with pesticide and suspended in a pasture in proximity to a salt lick, water supply or place the animals frequent. The animals make contact with these devices in the normal course of their routine. The dust bag or back rubber may also be located in a gateway which leads to a salt lick or water supply and which forces the animal to contact the device. Again, this method of insecticide application can be effective, but may not be practical for certain situations such as large ranches or free-range cattle.

Ear tags are widely used and are generally made of a molded polymer matrix impregnated (i.e., saturated or immersed) with a substance such as a pesticide or parasiticide. These ear tags or tapes are attached to animals by piercing the ear with a sharp post and corresponding locking receptacle or with adhesive. The pesticide slowly leaches from the carrier material and is deposited onto the animal. The animal then spreads the material by moving its head from side to side and by rubbing alongside other animals.

The delivery of substance from these known ear tags is problematic. Among other delivery problems, the tags release the substance after packaging such that it crystallizes on the surface of the tag itself, thereby exposing the user to a high concentration of the pesticide. Another significant problem is that the output of the tags is not constant. Initially, they supply excessive doses of the substance, but over time, their output falls below an effective or lethal level, where it remains. The tags then supply doses that are less than lethal for weeks or perhaps months before their nominal expiration date. Unfortunately, exposing parasites to a sub-lethal dose causes future generations of these pests to develop a resistance or immunity to the substance. In turn, for a given area in which the tags are used, the type of tags used must be frequently changed so that the pests are exposed to a new substance to which they have not developed a resistance. This can create excess inventory of tags that are no longer effective, and can undesirably result in tags that have only been worn by the animals a short time before having to be replaced. The labor and costs associated with "re-tagging" animals mid-season can be quite large.

Moreover, the types of substances which can be used to saturate known ear tags is generally limited due to solubility and/or compatibility between the saturating substance and the polymer matrix. For example, compounds like ivermectin and spinosad have relatively high molecular weights and poor solubility in polymers such as polyethylene. These compounds are essentially incompatible with conventional ear tags.

Another problem with known ear tags is the inherent limit in the amount of liquid pesticide that can be saturated into a given size polymer matrix. It is not practical to produce a device large enough to contain sufficient insecticide to kill pests for an entire season. The size of the device would be such that it interferes with the animal's normal routine and would likely cause discomfort or injury to the animal, such as eye irritation, drooping ears, tears in the ear at the location of attachment, etc.

It would be desirable to have an application method and dispenser that is capable of dosing a repeatable, prolonged, and lethal application of pesticide to an animal with no gradual decline, but rather, a sudden and complete cessation of exposure, and does not require further herding, handling or contact with the animal.

SUMMARY OF THE INVENTION

The present invention provides a dispenser that delivers a small but consistent and sustained dose of fluid over an extended period of time.

In one form thereof, the present invention provides a dispenser. The dispenser has a shell having an opening. A reservoir is disposed in the shell and is saturated with a liquid substance. A wick is in fluid communication with the reservoir. The wick extends through the opening and has a greater capillary attraction than the reservoir, whereby during use of the dispenser the wick draws pesticide from the reservoir and deposits the liquid substance on an animal upon contact.

In preferred forms of the dispenser, various methods may be used to provide the wick with a greater capillary attraction or wicking ability than the reservoir. For example, the wick may be made of a material having a greater density than the material from which the reservoir is formed. Also, depending upon the hydrophilicity of the substance being dispensed, a wick that is more hydrophilic than the reservoir may result in a greater capillary attraction for the wick. A wick having a smaller pore size than the reservoir may also result in the wick having a greater capillary attraction than the reservoir. In certain embodiments, the wick and the reservoir are comprised of the same material and the shell comprises a sleeve that exerts a compressive force on the wick to reduce its pore size and thus increase its capillary attraction.

In certain exemplary embodiments, the wick either protrudes from the opening or is substantially flush with the opening. More preferably, the shell comprises a sleeve which defines the opening, and the wick is disposed in the sleeve. A skirt extends from the shell, the skirt at least partially surrounding the sleeve.

In another form thereof, the present invention provides a novel method of dispensing a substance onto an animal. In this method, a pesticide dispenser is provided. The dispenser has a shell and a reservoir disposed in the shell. The reservoir contains or is saturated with a liquid substance such as a pesticide, and a wick is in fluid communication with the reservoir. The wick extends into the opening. In the inventive method, the dispenser is attached to the animal such that the wick is free to contact the animal as the animal moves. The animal is permitted to go about its normal activities, during which the liquid substance is gradually dispensed from the dispenser and onto the animal by capillary action.

In a preferred form thereof, the wick has a greater capillary attraction than the reservoir and the wick continues to draw the substance from the reservoir and dispense it until the dispenser is essentially empty. More preferably, the liquid substance is a pesticide and the dispenser may dispense the pesticide for at least 120, and more preferably, at least 180 days when attached to an animal that goes about normal activities such as grazing.

One advantage of the present invention is that the dose of substance being dispensed remains substantially constant as the supply is being consumed. That is, the dose being dispensed does not drop off appreciably until the dispenser is almost empty. The amount of the dose dispensed with dispensers embodying the present invention is substantially independent of the volume of liquid contained in the dispenser. This addresses the problems with known polymer tags that initially produce an extremely high dose which soon drops off to a sub-lethal dose that quickly allows pests to develop a resistance or immunity to the substance being dispensed. Since dispensers in accordance with the present invention can produce a consistently lethal dose until substantially depleted, the chance of pests developing a tolerance to the substance is reduced, or at least takes much longer than with polymer saturated tags.

Another advantage of the present invention is that a small, lightweight dispenser may be filled with sufficient pesticide to last an entire season before being depleted. The costs and labor associated with mid season "re-tagging" are thus avoided with the present invention.

Yet another advantage of the present invention is that the dispensers can be handled and attached without contacting the substance contained therein. The only source of the pesticide (or whatever substance the dispenser may happen to contain) is the wick. However, in exemplary embodiments, the wick is either substantially flush with the opening or protrudes slightly from the opening. Touching the wick when, e.g., attaching the device to an animal's ear can easily be avoided.

Still another advantage of the present invention is that the shape of dispensers formed in accordance with preferred embodiments is ergonomic. That is, the animals generally appear able to tolerate wearing the dispensers for long periods of time without noticeable irritation and without the dispensers getting ensnared by, e.g., fences, other animals, or otherwise interfering with the animals' normal routine.

BRIEF DESCRIPTION OF THE DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein.

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
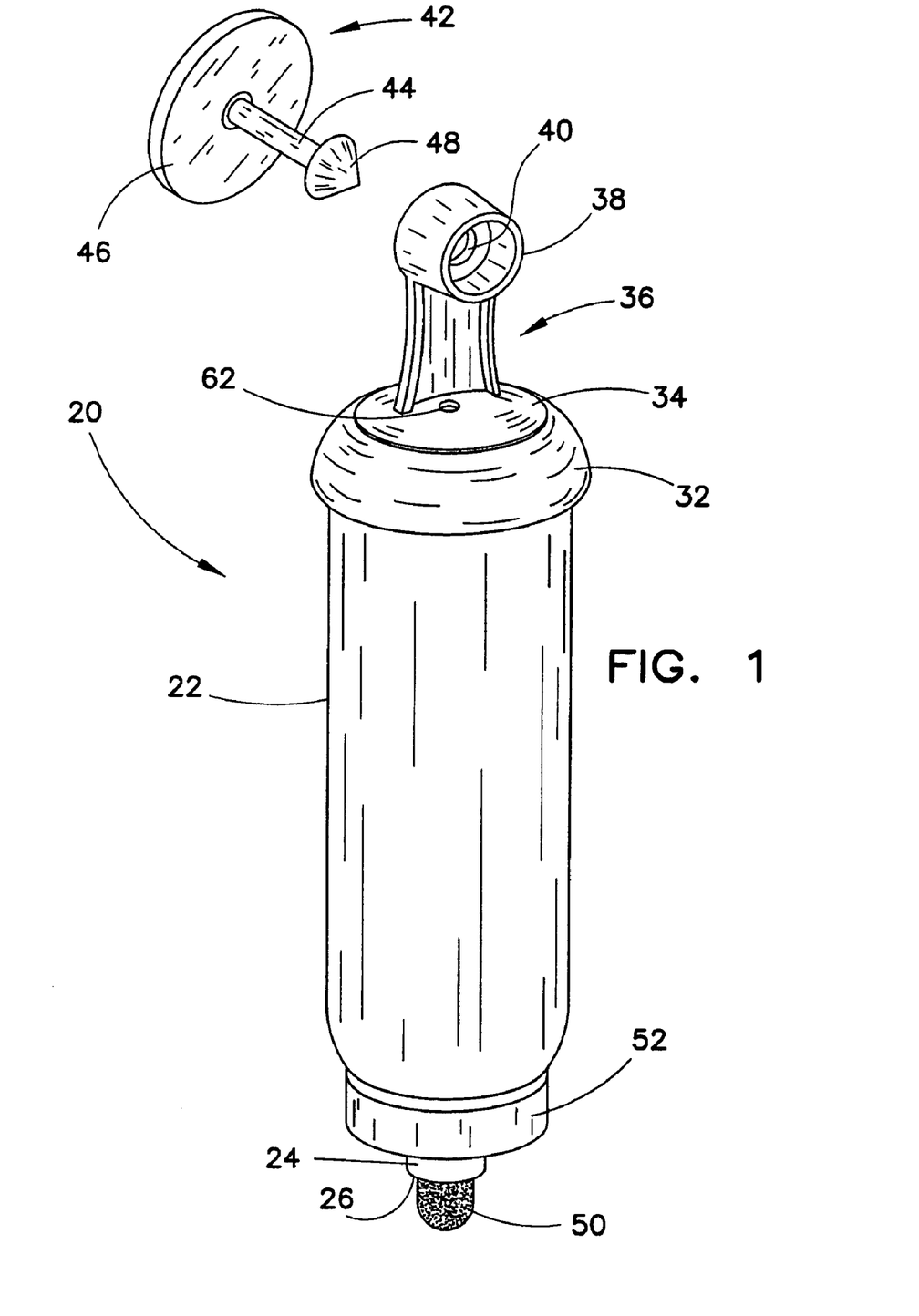
FIG. 1 is a perspective view of a dispenser in accordance with one embodiment of the present invention.
Figure 1A:
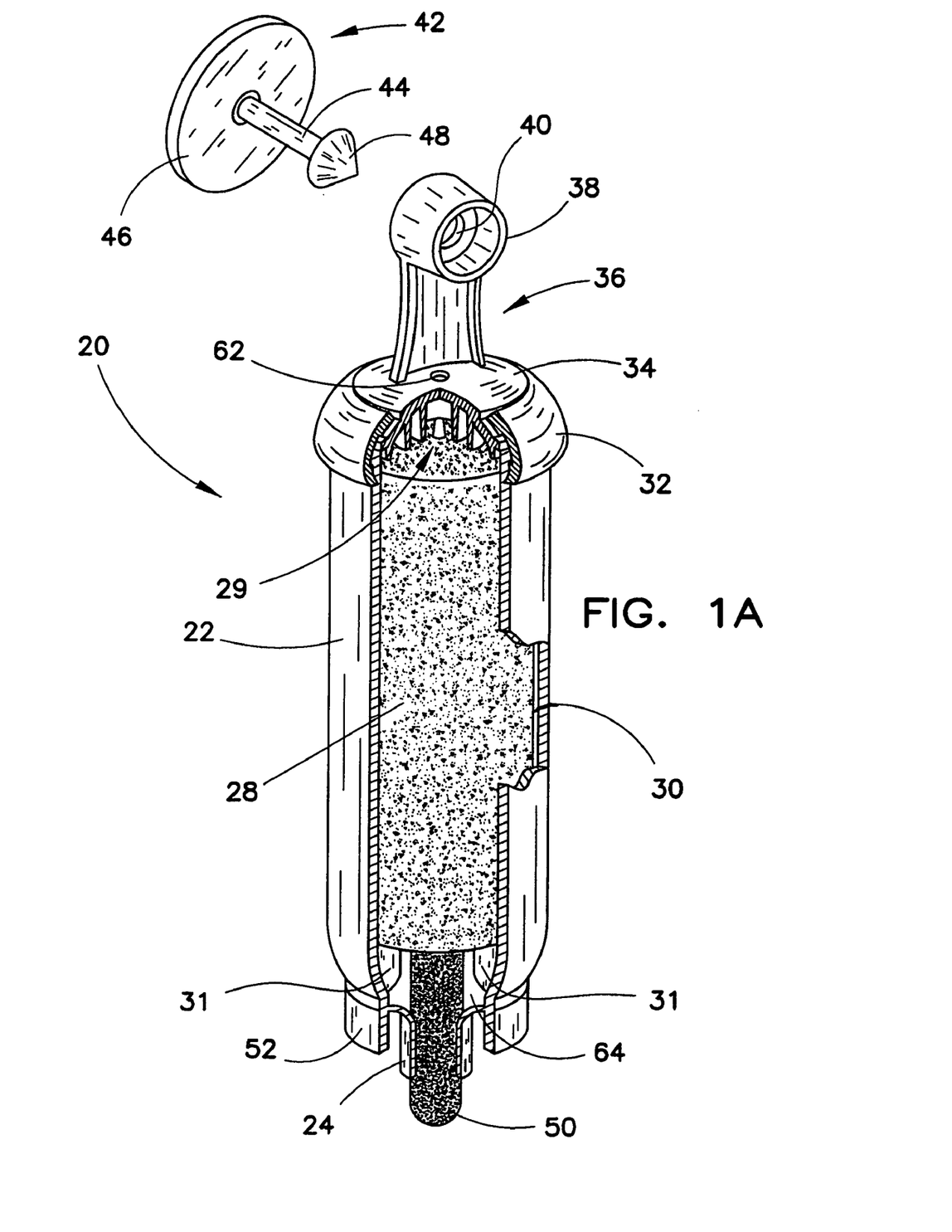
FIG. 1A is a perspective view of the dispenser shown in FIG. 1 with parts of the dispenser broken away to expose the interior of the dispenser.

Referring now to FIGS. 1 and 1A, dispenser 20 includes an outer shell 22 that defines a tip or sleeve 24 that terminates in an opening 26. Shell 22 in the illustrated embodiment is made of Formax 609, Acetal Copolymer from Chem Polymer Corporation, which is a fairly hard, lightweight material that is preferably formed by injection molding. One of skill in the art would readily recognize many suitable lightweight materials that could be used for shell 22, including various polymers, glass, hard rubber, wood, metal and the like. Disposed within shell 22 is reservoir 28 that is typically saturated with a pesticide that is held therein without substantial dripping by capillary action, as explained in more detail below. The material chosen for reservoir 28 can be any of a wide variety of materials know in the art, such as fibrous bundles, sponge material, porous plastics and the like. Materials suitable for reservoir 28 generally contain the liquid substance therein by capillary action without allowing the liquid to drip from the material. For purposes of this specification, the term "pesticide" is meant to include substances that kill one or more types of numerous small invertebrate animals such as horn flies, face flies, beetles, gnats, spiders, centipedes, arthropods and the like. Furthermore, while the illustrated embodiment is described with reference to a pesticide, one of skill in the art would readily recognize that many liquid substances could be employed with dispensers embodying the present invention, including but not limited to medicaments, growth hormones, therapeutic agents, drugs, pheromones, pesticides, insecticides, repellants, scents, and the like. It is preferable that the liquid substance be substantially non-volatile. Since the wick is typically exposed, a volatile liquid substance used with dispensers embodied by the present invention would tend to evaporate, undesirably causing the dispenser to "dry out." A series of ribs 29 and 31 holds the reservoir in place in the shell. As shown in FIG. 1A, a gap 30 exists between the reservoir 28 and the interior surface of shell 22 to facilitate venting during use.

Figure 2:
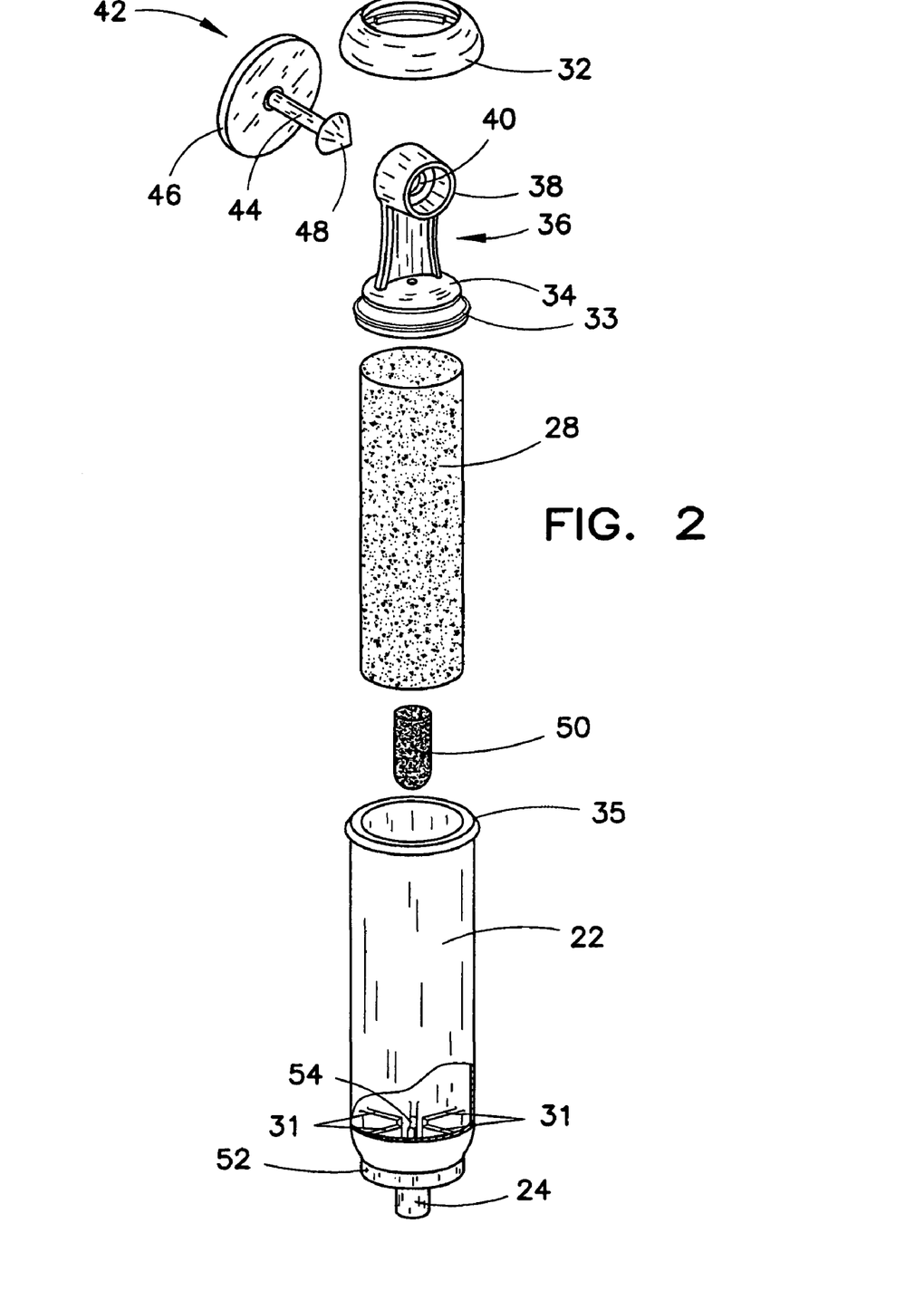
FIG. 2 is an exploded perspective view of the dispenser shown in FIG. 1.

Dispenser 20 includes a ring 32 that secures cap 34 to shell 22, as can be appreciated with reference to FIG. 2. Ring 32 has lips extending from its interior that interlock in a snap-fit engagement with lips 33 and 35 of cap 34 and shell 22, respectively. Integrally formed with cap 34 is attachment means or flexible grommet 36 that includes loop member 38 having a round hole 40 formed therein. The attachment mechanism is preferably formed of a flexible polymer such as a thermoplastic elastomer so that the dispenser can move as it hangs from the animal to which it is attached. One suitable polymer is Hytrel® 5526 from DuPont Engineering Polymers. Attachment member 42 includes a cylindrical post 44 extending from flange member 46 and has a conical locking member 48 disposed at its terminal end. In use, member 48 is pushed through hole 40, as described in more detail below. While one attachment means has just been described, one of skill in the art would readily recognize numerous other suitable attachment means, including tapes, adhesives, collars, harnesses, clamps, staples and many others.

A wick 50 is in fluid communication with reservoir 28 and extends through opening 26. Fluid communication is established by having the wick 50 pressed against or abutting reservoir 28, in those embodiments in which the reservoir and wick are formed separately. In the illustrated embodiment, wick 50 has a greater "capillary attraction" or "wicking ability" than does reservoir 28, which means that wick 50 will tend to draw fluid from reservoir 28 by means of capillary action, as explained in greater detail below. A skirt 52 extends downwardly from shell 22 and protects wick 50, as explained below.

Figure 2A:
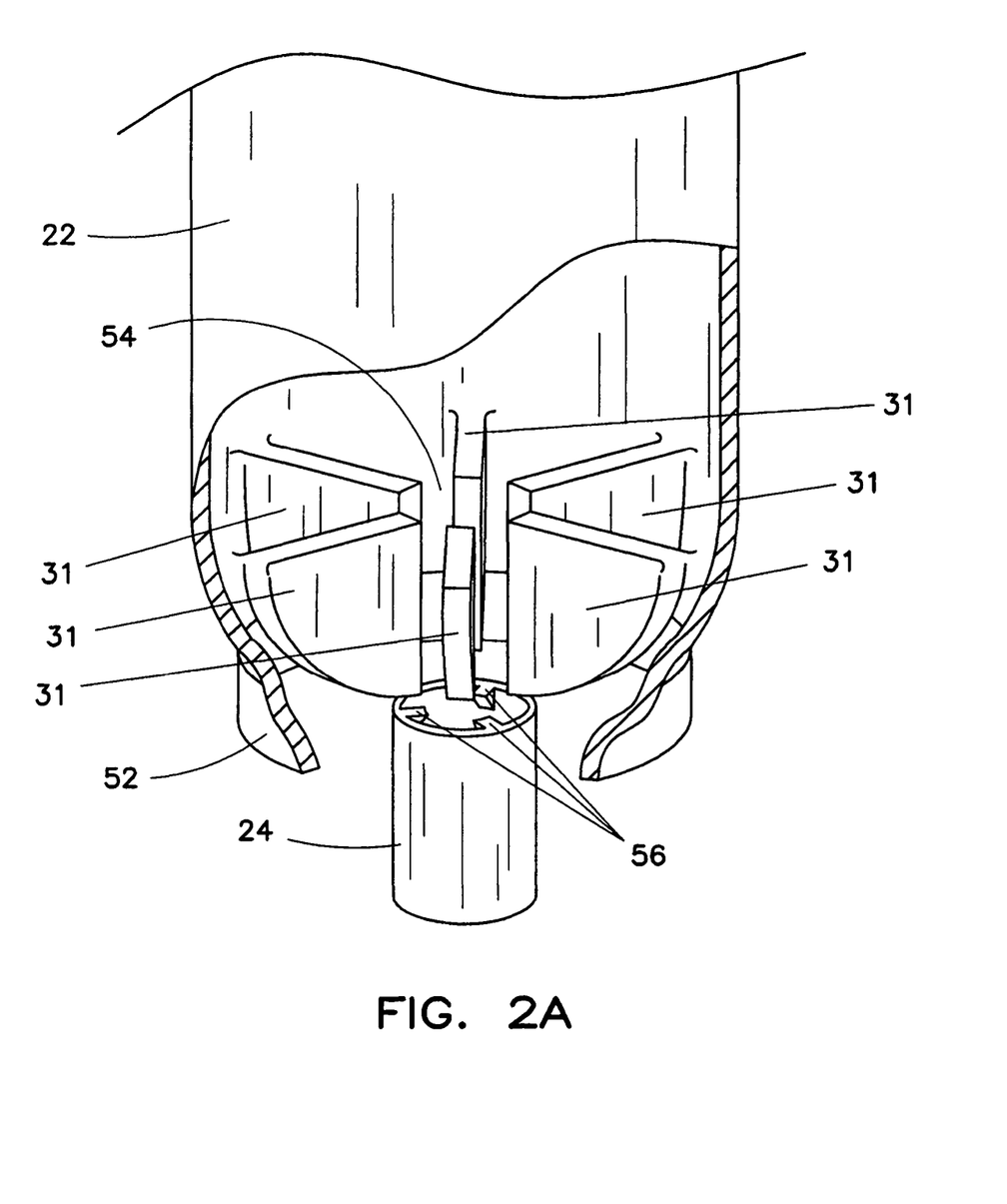
FIG. 2A is a fragmentary perspective view of the dispenser of FIG. 1 with parts broken away to show a rib structure in accordance with an embodiment of the present invention.

With reference to FIGS. 2 and 2A, it can be appreciated that ribs 31 are integrally formed with shell 22 and support the bottom of reservoir 28 and also define a cylindrical hollow space 54 through which wick 50 is received. Sleeve 24 includes nubs 56 that hold wick 50 in place in the sleeve and also hold it in place in an abutting relationship with reservoir 28 so that fluid transfer is facilitated. In certain embodiments, the nubs may hold the wick away from the sleeve and thereby provide a vent space for air to enter the dispenser as fluid is dispensed. In other embodiments, the nubs may be eliminated. Sleeve 24 may be elongated as shown in FIGS. 1, 2 and 2A, or in other embodiments may merely comprise an opening in shell 22 through which the wick is disposed. The sleeve may be employed to adjust the wicking properties of the wick, as explained in more detail below.

Figure 2B:
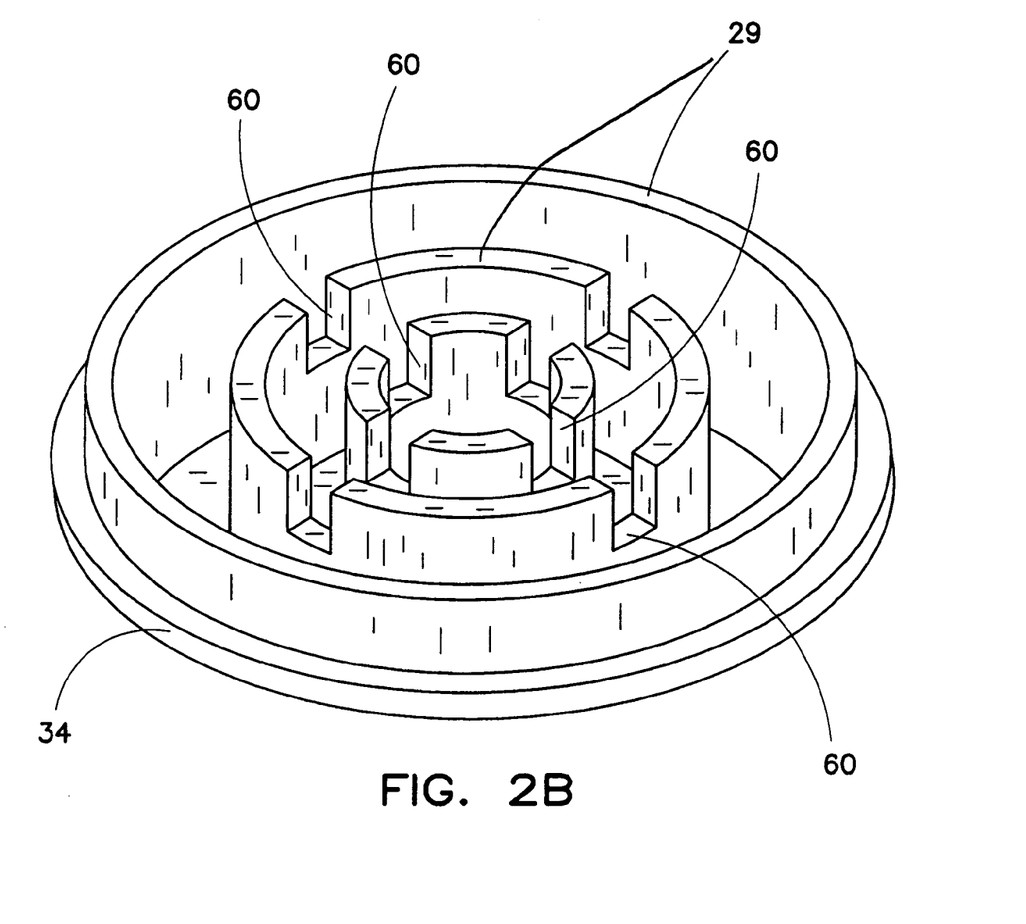
FIG. 2B is a perspective view of the underside of a cap of the dispenser shown in FIG. 1.

With reference to FIG. 2B, the bottom side of cap 34 includes circular ribs 29 extending therefrom. The ribs define aligned channels 60 for venting. As shown in FIG. 1, cap 34 includes a vent hole 62 formed therein which allows air to enter as fluid is dispensed from wick 52. The air enters through vent 62, and is able to reach gap 30 by means of channels 60. As shown, gap 30 continues along the length of reservoir 28 until it terminates at a void portion 64 that partially surrounds wick 50. Proper venting is necessary to prevent a vacuum effect that would counteract the capillary forces required for fluid payout.

Figure 3:
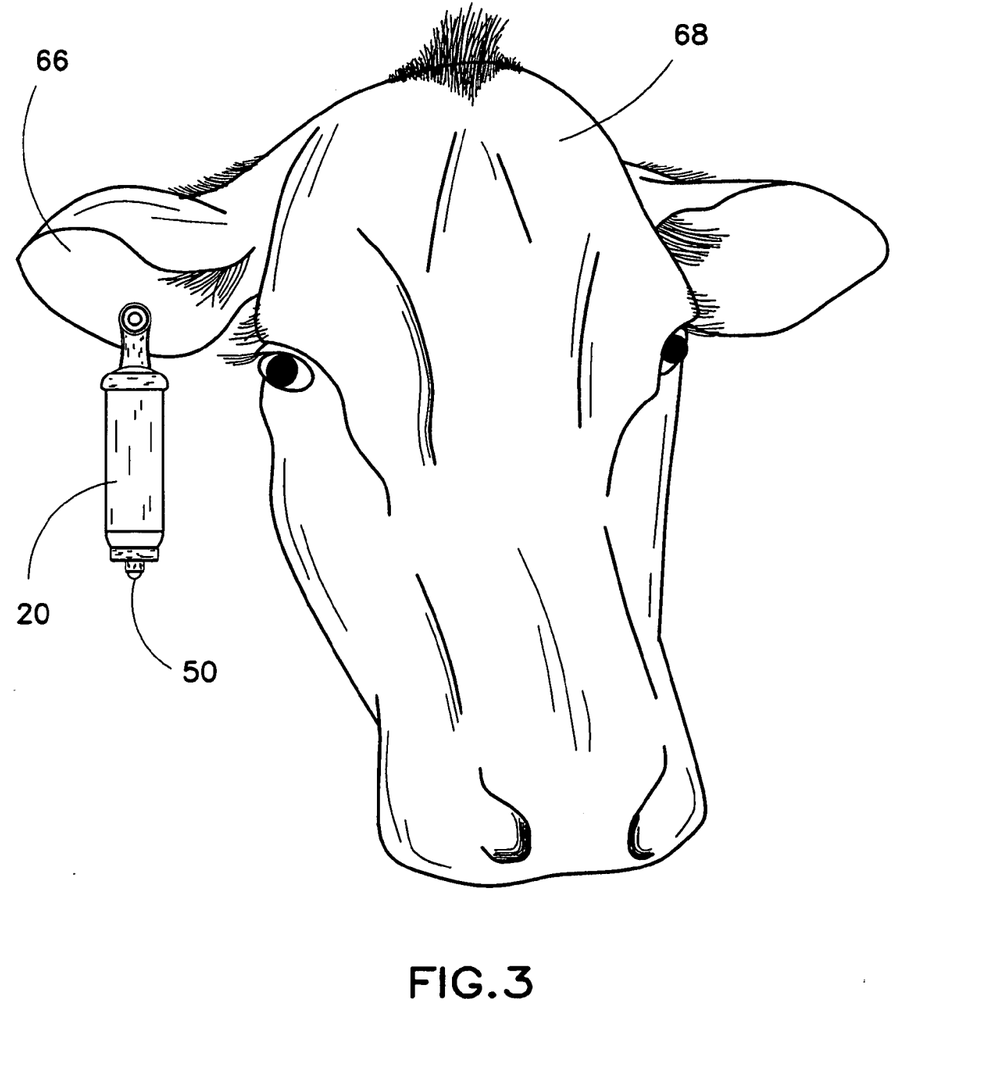
FIG. 3 is a perspective view of the dispenser of FIG. 1 attached to an animal.

With reference to FIGS. 1, 2 and 3, dispenser 20 is attached to the ear of animal 68, which in the illustrated embodiment is a cow. The dispenser is attached to the animal such that the wick is pointed downward and dispenser 20 is free to move as the animal's ear is moved or "flicked" and can thus contact the animal as the animal goes about its normal activities. Dispenser 20 attaches to the animal's ear by means of attachment member 42 and flexible grommet 36. The animal's ear is pierced and post 44 is pushed through the hole produced by piercing and is then fed into hole 40. It has been found that post 44 of attachment member 42 is sized sufficiently long so as to avoid squeezing the animal's ear between flange member 46 and loop member 40. Instead, the ear fits comfortably between flange member 46 and loop member 40. It has been found that this method of attachment allows dispenser 20 to be worn by a cow for several months without the cow's ear becoming irritated, even though dispenser 20 when full weighs about 30 grams.

When the wick touches the animal's fur or skin, the pesticide is dispensed by capillary action. While shown attached to the animal's ear, the dispenser 20 could be attached to the tail, hung around the neck or otherwise attached to the animal. The dispenser should be attached, however, such that the animal's normal movement causes the pesticide to be transferred to the animal's fur or skin by mechanical contact with the wick, much like a pen deposits ink on a page upon contact. Once the liquid pesticide is deposited onto the animal, it is further spread through the animal's normal movement and through contact with other animals. As the animal moves its head from side to side and rubs along other animals through social contact, it has been found that the liquid pesticide is spread along the entire length of the animal.

Figure 1B:
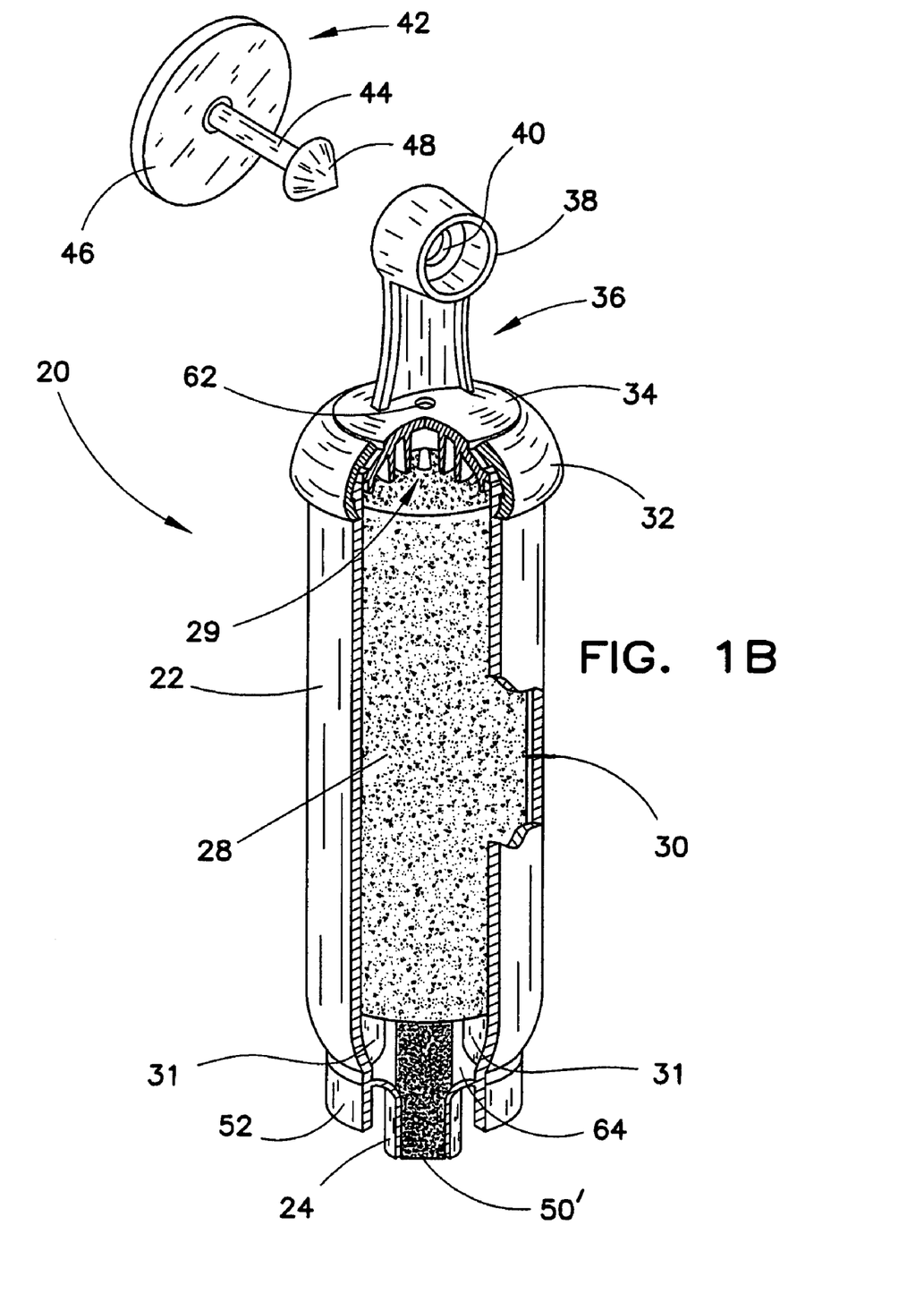
FIG. 1B shows a modification of the dispenser shown in FIG. 1A in which the wick is substantially flush with the opening of the dispenser.

As the animal's movement continues and pesticide is dispensed from wick 50, wick 50 in turn continues to draw pesticide from reservoir 28 because, as noted above, the wick has a greater capillary attraction than the reservoir. Advantageously, the wick continues to draw pesticide from the reservoir and dispenses the pesticide until the dispenser is essentially emptied of pesticide and provides a substantially constant level of output until the dispenser is almost empty. In other words, the rate of dispensing is substantially independent of the amount of fluid contained in the reservoir until the reservoir is close to being empty. Thus, the problems with saturated polymer tags in which the pesticide quickly drops off to a sub-lethal dose are avoided. In conditions of normal use, the dispenser can be used for at least 30 days, preferably 60 days, more preferably at least 120 days, and most preferably at least 180 days, before the pesticide is depleted. This is longer than known polymer tags that are saturated with pesticides. The amount of substance dispensed per contact can be adjusted by adjusting the extent to which the wick protrudes from the opening. In certain exemplary embodiments, the end of the wick 50' shown in FIG. 1B terminates at a position that is substantially flush with the opening. In other embodiments, the end of the wick may be slightly recessed within the opening, but still provide sufficient contact with the fur of the animal to obtain an optimum dispense rate. If the wick protrudes only slightly or does not protrude from the opening, the possibility of it becoming caught on or making excess contact with the animal's fur is reduced.

As noted above, wick 50 must have a greater capillary attraction than the reservoir. It should be understood that for purposes of this application, "capillary attraction" means the tendency of a material to draw liquid therein. The higher the "capillary attraction," the greater this tendency. Those of skill in the art also refer to this tendency as "wicking," "wicking ability," "capillary action," "capillary pull," "wicking strength" and the like. Felt has excellent, predictable, and consistent wicking capabilities, and various types of felt can be used for both the wick and reservoir. Fibrous bundles are also excellent choices for wick 50 and reservoir 28. For example, one commercial material suitable for wick 50 is bonded polyolefin fiber bundle with a density of 0.27 g/cc (supplied by Filtrona Fibertec, 1625 Ashton Park Drive, Colonial Heights, Va., 23834) Filtrona sample no. 05-052. One commercial material suitable for reservoir 28 is bonded polyolefin fiber bundle with a density of 0.122 g/cc (supplied by Filtrona Fibertec, 1625 Ashton Park Drive, Colonial Heights, Va., 23834) Filtrona sample no. 03-368A. One of skill in the art would readily recognize, however, that many other materials can be used for the wick and the reservoir, such as cotton, polyester, fibers (including glass fibers), nylon, polypropylene and many others. The materials should be chosen such that the wick has a greater capillary action or wicking strength than the reservoir, and such that the fur of the animal draws fluid from the wick by capillary action upon contact.

The selection of materials for the wick and reservoir may depend upon the substance being dispensed, e.g., its viscosity, volatility, hydrophilicity, surface tension and other fluid properties. Liquids dispensed with dispenser 20 are typically non-volatile so that they do not evaporate from wick 50, but instead are only transferred from wick 50 upon contact. Generally speaking, if felt or a fibrous bundle is used for reservoir 28 and wick 50, the capillary action or wicking ability increases with increasing density of the substance. However, the wicking properties of wick 50 and reservoir 28 can vary with the type of substance being dispensed. The exemplary wick and reservoir material identified in the previous paragraph were tested and performed satisfactorily when the substance being dispensed was spinosad formulation M08-AH00277-7-1 (lot X-51908) Elanco Animal Health, 2001 West Main Street, Greenfield, Ind. 46140, as detailed in the examples below.

Figure 4:
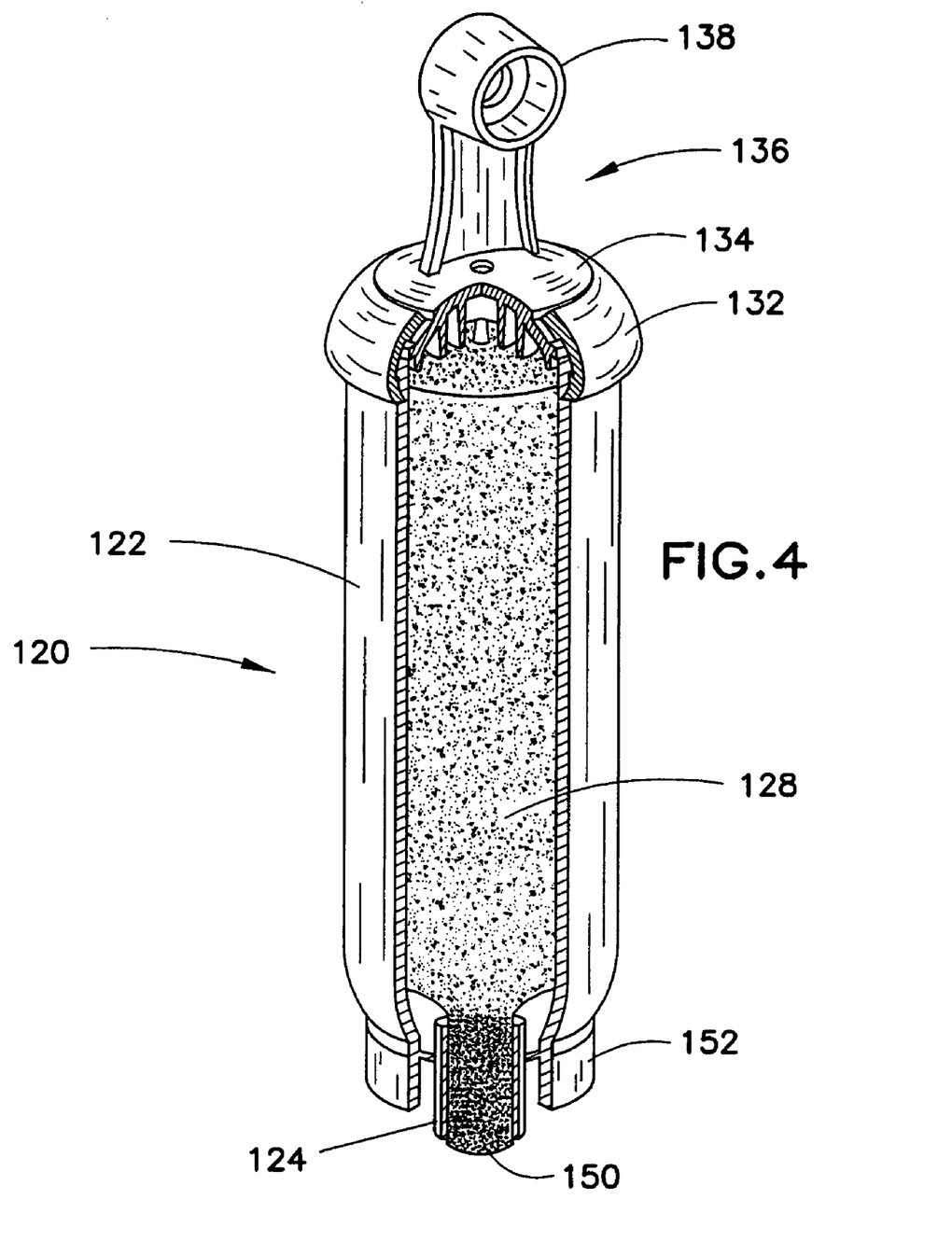
FIG. 4 is a perspective view of an alternate embodiment of a dispenser in accordance with the present invention with parts of the dispenser broken away to expose the interior thereof.

With reference to FIG. 4, an alternate embodiment of a dispenser 120 is shown in which reservoir 128 and wick 150 are formed from a unitary material. As shown, wick 150 is compressed and "squeezed" by sleeve 124. That is, sleeve 124 exerts a compressive force on wick 150. The compression of wick 150 increases its density and thus increases the number of pores per unit volume. This in turn tends to increase its wicking strength or capillary attraction. In certain circumstances, it may be advantageous to manufacture the reservoir and wick from a single piece of material, and the dispenser shown in FIG. 4 is an example of how that can be accomplished.

Figure 5:
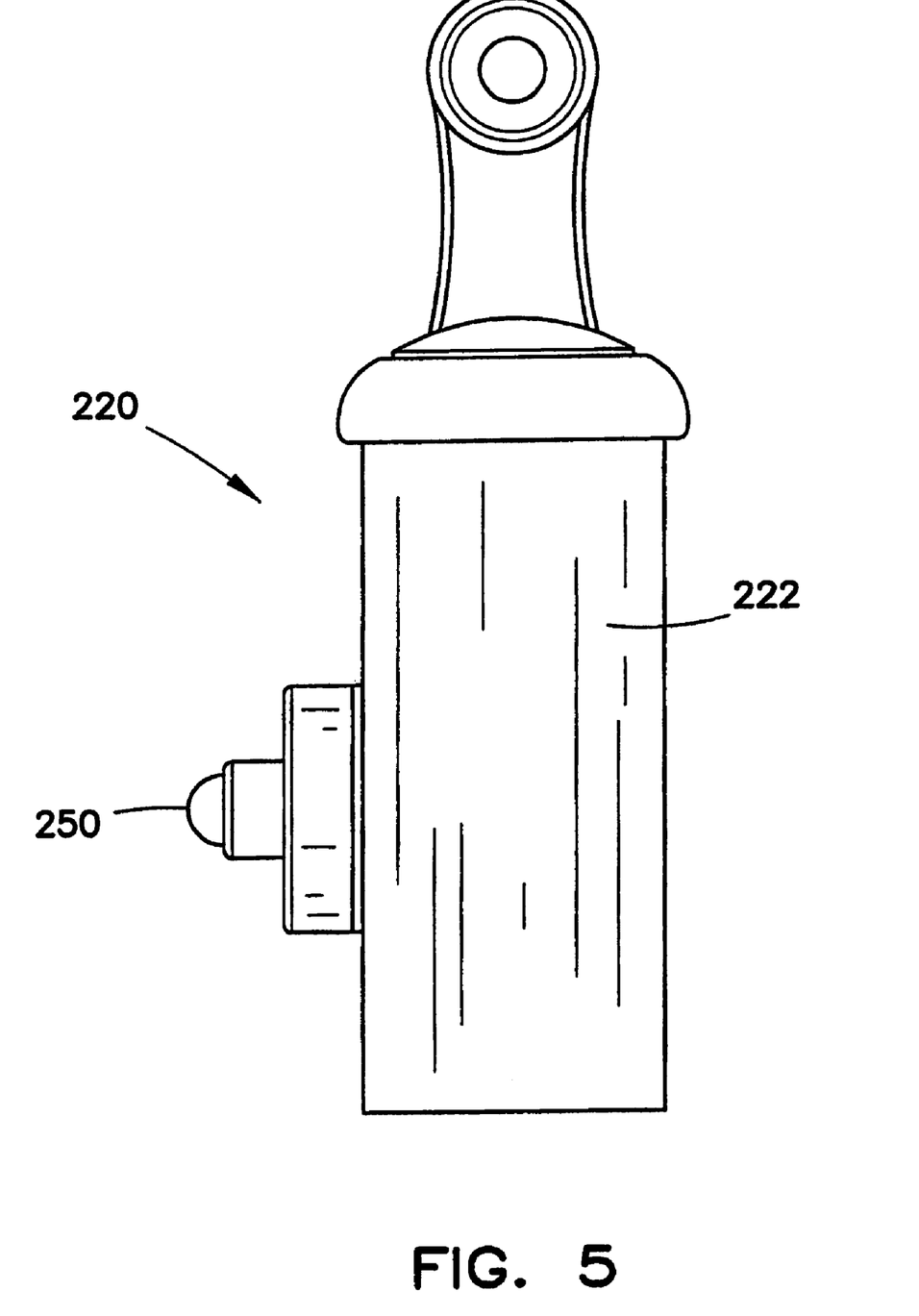
FIG. 5 is a side view of an alternate embodiment of a dispenser in accordance with the present invention.

Furthermore, it should be appreciated that because the disclosed embodiments work by capillary action, the wick need not be placed at the bottom of the dispenser and the dispenser need not be attached to the animal such that the wick is pointing downward. With reference to FIG. 5, dispenser 220 includes a wick 250 that extends laterally from the side of shell 222. The capillary forces that drive fluid flow in the illustrated embodiments can work against gravity, if so desired. However, in the embodiment illustrated in FIG. 1, skirt 52 partially surrounds or circumscribes the sleeve 24 and wick 50, which tends to prevent rain water from contacting wick 50, either directly or dripping from shell 22. If excessive rain water were to fall upon wick 50 or drip onto it from the sides of the dispenser, such could dilute the strength of the pesticide that is contained in the dispenser or otherwise undesirably alter the wicking properties of the device.

Since the dispenser disclosed herein delivers fluid by wicking, as opposed to gravity or pressure differentials, a wide variety of pesticides can be used. These include but are not limited to various avermectins, benzimidazoles, milbemycins, carbamates, organophosphates, phenylpyrazoles, amidines, insect growth regulators, juvenile hormones, nicotinoids, pyrroles, pyrethrins, pyrethroids and naturalytes (i.e. the spinosyn family). Representative compounds may include abamectin, doramectin, eprinomectin, selamectin, alphamethrin, amitraz, coumaphos, ivermectin, deltamethrin, cyhalothrin, diazinon, cyromazine, cypermethrin, milbemycin, cyfluthrin, cyloprothrin, famphur, fenthion, fenvalerate, flucythrinate, flumethrin, hexaflumuron, lindane, lufenuron, malathion, methoprene, metriphonate, moxidectin, permethrin, pyrethrin, pyrethrum, phosmet, pirimiphos, chlorvinphos, rotenone, propetamphos, tetrachlorvinphos, zetacypermethrin, coumaphos and spinosad, among others.

Figure 6:
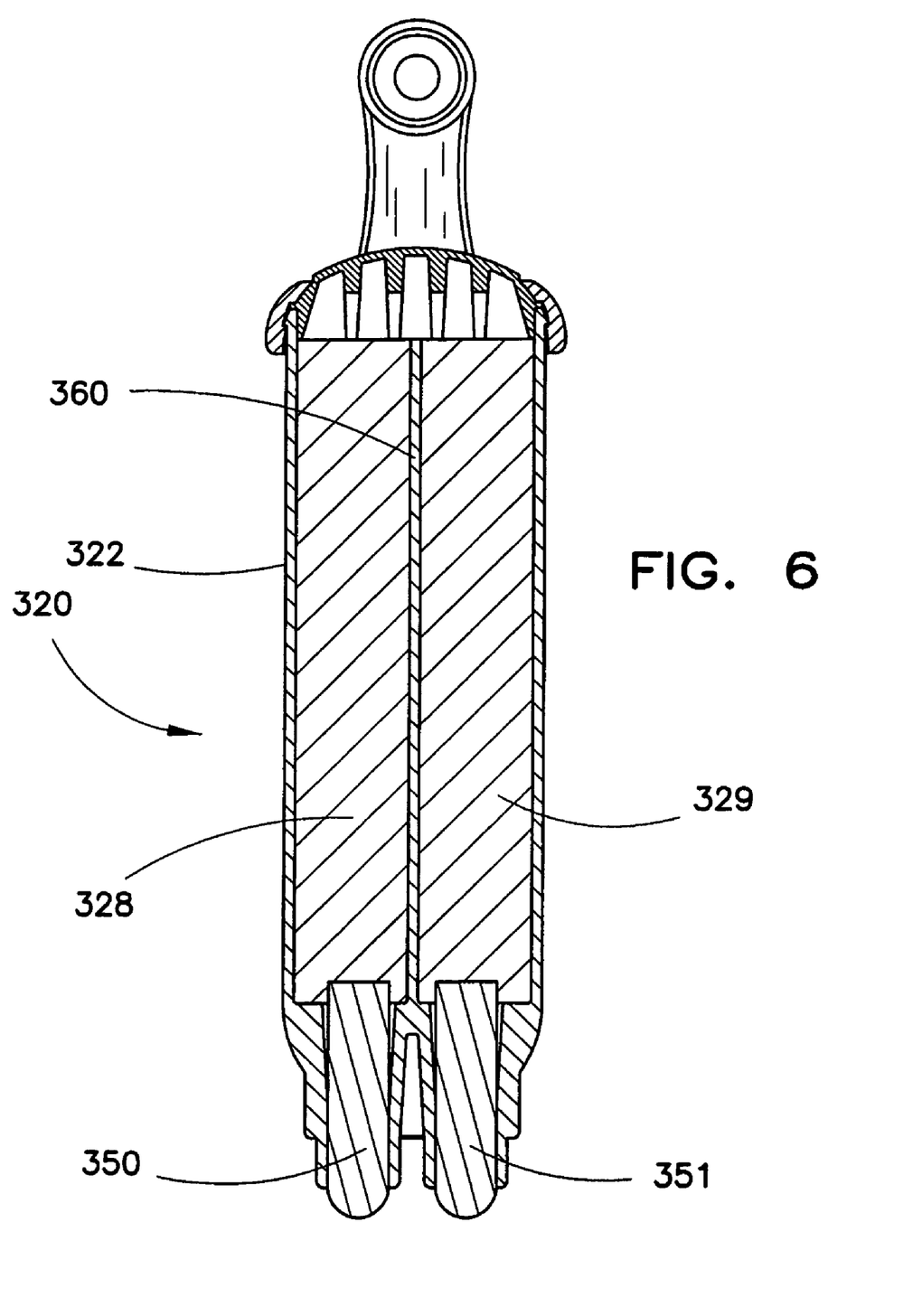
FIG. 6 is a sectional view of an alternate embodiment of a dispenser in accordance with the present invention.
Figure 7:
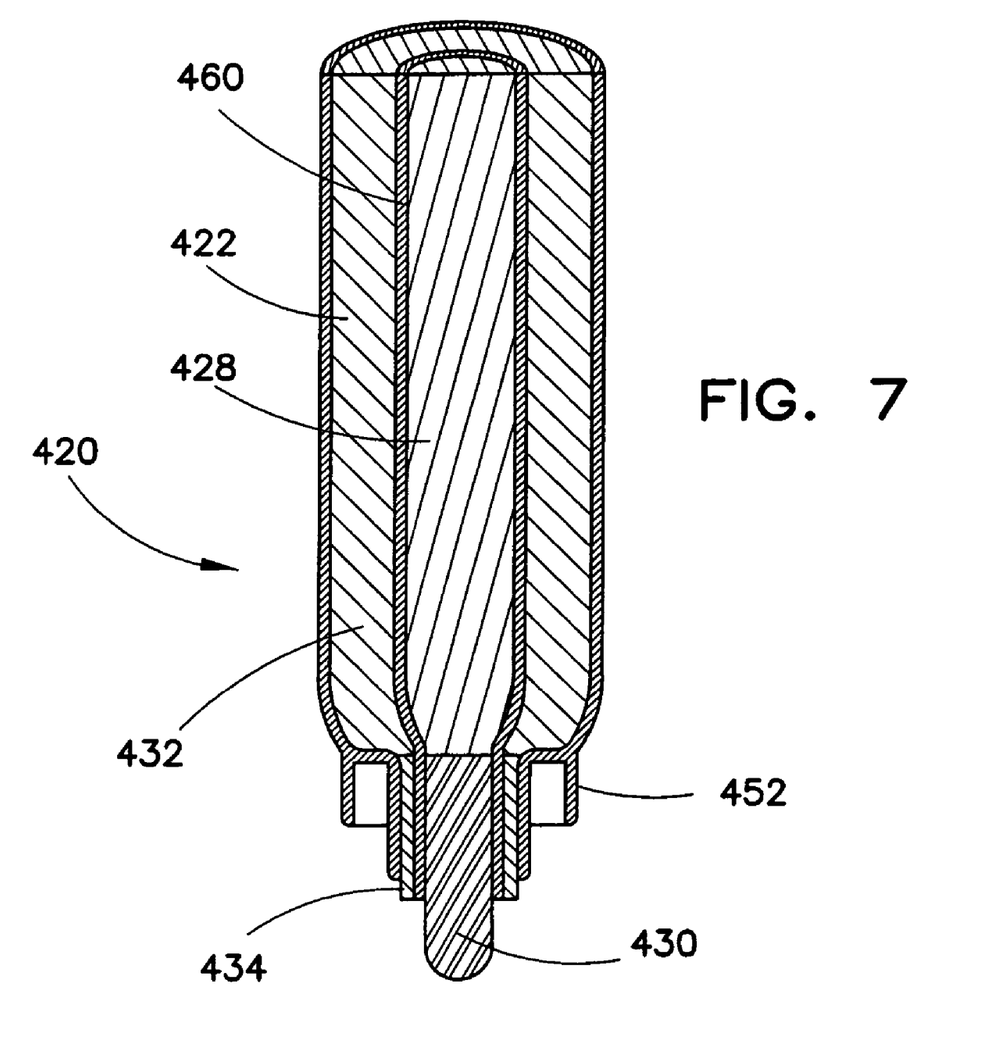
FIG. 7 is a sectional view of another alternate embodiment of a dispenser in accordance with the present invention.

FIGS. 6 and 7 illustrate embodiments in which multiple substances can be dispensed. Exemplary substances capable of being dispensed together in accordance with the present invention include, but are not limited to, lambdacyhalothrin, gamma-cyhalothrin and imidacloprid. With reference to FIG. 6, dispenser 320 includes reservoir 328 in fluid communication with wick 350 to dispense a first substance by capillary action. Similarly, reservoir 329 is in fluid communication with wick 351 to dispense a second substance by capillary action. Shell 322 includes a divider 360 that maintains reservoir 328 separate from reservoir 329. In FIG. 7, dispenser 420 includes centrally disposed reservoir 428 in fluid communication with wick 430 and annular reservoir 432 in fluid communication with wick 434. Dispenser 420 includes an outer shell 422, similar to shell 22 described with reference to FIG. 1, and an inner shell 460 that separates the two reservoirs. As shown in FIG. 7, both wicks have surfaces thereof exposed for contact with the animal to which dispenser 420 is attached. A skirt 452 may prevent rain water from reaching wicks 430 and 434.

EXAMPLES

Specific examples embodying the technology described above are set forth below.

Example 1

Objective: In this example two prototype devices similar in structure to device 20 described above were tested to determine the fluid payout difference between a dispenser that had repeated mechanical contact compared to an identical dispenser left in a static position.

Prototype Description: The dispensers used in this example were fabricated from a plastic shell and insert materials used in a marker manufactured by Sanford Corp. under the Accent® brand. The reservoir was made of Formax 609, Acetal Copolymer from Chem Polymer Corporation and a wick formed from bonded polyolefin fiber bundle with a density of 0.27 g/cc (supplied by Filtrona Fibertec, 1625 Ashton Park Drive, Colonial Heights, Va., 23834) Filtrona sample no. 05-052. The devices were filled with approximately 8 cc of spinosad formulation M08-AH00277-7-1 (lot X-51908) and weight was recorded.

An attachment means similar to attachment means 36 was grafted to the top of the dispenser shell that was used for the repeated mechanical contact, and this dispenser was attached to a mechanical cow ear having faux fur. The other dispenser (which was maintained stationary) had no attachment means, only a plug to seal it at the top, which explains the discrepancy in weights between the two dispensers.

Test Apparatus:
  Ohaus Explorer Pro analytical balance
  Mechanical cow ear (custom manufactured by Aircom Mfg., Inc.)
Observation Method:
  One device was attached to the mechanical cow ear and allowed to run at an approximate rate of one cycle per 7 seconds. Each cycle consists of the ear flicking backward and making momentary contact with the faux fur. The other device was placed in a vertical and stationary position and left undisturbed with the exception of weight recording. The devices were weighed at regular intervals and weights were recorded.
Observations:
  After one hour of cycling, there was visible evidence of the spinosad formulation on the faux fur. The odor of the formulation could also be detected on the faux fur. The devices were checked again at 24 hours. Results are recorded in Table 1, below.
  After the 24 hour check the test was re-started. The weight of the devices were checked hourly for five hours. The fur was changed to a clean patch at each hour in an attempt to obtain a more consistent payout. The results presented in Table 1 show that the device that repeatedly contacted the faux fur dispensed at an hourly rate of approximately 55 times greater than the dispenser that was held stationary.

TABLE 1

Weight Loss Results

|  | Moving device (grams) | Static device (grams) |
|---|---|---|
| Start weight | 16.97 | 13.36 |
| Weight @ 3.5 hrs | 16.891 | 13.358 |
| 3.5 hr loss | 0.079 | 0.002 |
| Weight @ 24 hrs | 16.712 | 13.341 |
| 24 hr loss | 0.258 | 0.019 |
| Start weight | 16.712 | 13.331 |
| Weight @1 hr | 16.704 | 13.331 |
| 1 hr loss | 0.008 | 0 |
| Weight @ 2 hrs | 16.693 | 13.331 |
| 2 hr loss | 0.019 | 0 |
| Weight @ 3 hrs | 16.685 | 13.331 |
| 3 hr loss | 0.027 | 0 |
| Weight @ 4 hrs | 16.676 | 13.33 |
| 4 hr loss | 0.036 | 0.001 |
| Weight @ 5 hrs | 16.657 | 13.33 |
| 5 hr loss | 0.055 | 0.001 |
| Average loss/hr | 0.011 | 0.0002 |

Example 2

The objective of this test was to determine if the dispenser payout rate can be altered by changing the amount of surface area of the wick exposed at the tip of the device, i.e., whether the rate can be altered by increasing the amount by which the wick protrudes from the opening.

Prototype Description: A dispenser as described above with respect to Example 1 was used. The dispenser was filled with approximately 8 cc of spinosad formulation M08-AH00277-7-1 (lot X-51908) and weight was recorded.

As in Example 1, the dispenser used for the repeated mechanical contact had an attachment means, whereas the stationary device did not.

Test Apparatus:

Ohaus Explorer Pro analytical balance

Aircom mechanical cow ear

Observation Method:

The dispenser initially had its wick protruding about ¼" from the opening of the dispenser. It was attached to the mechanical cow ear and allowed to run at an approximate rate of one cycle per 7 seconds. Each cycle consists of the ear flicking backward and making momentary contact with the faux fur. The device was allowed to cycle for two hours. Weight was recorded at each hour. At the end of the two hours, the device was removed from the mechanical ear and approximately ½ of the protruding portion of its wick was removed. Weight was recorded and the above sequence was repeated. At the end of the second two hour cycle, the device was once again removed from the mechanical ear and the wick was cut flush with the end of the device. Weight was recorded and the above sequence was repeated.

Observations:

Shortening the wick and accordingly decreasing the surface area available for contact produces a measurable effect on payout. The payout decreased by a little more than 50% when the amount of the wick protruding was reduced by about half. The dispenser then lost very little or no weight when the wick was cut off flush with the opening. It was also difficult to detect any of the liquid spinosad formulation on the faux fur, whereas the liquid spinosad could be easily seen on the samples taken with an exposed wick. Table 2, below, illustrates these results.

TABLE 2

| Weight Loss Results | | | |
|---|---|---|---|
| | Unaltered Wick (grams) | Half Cut Wick (grams) | Flush Cut Wick (grams) |
| Start weight | 16.63 | 16.558 | 16.48 |
| Weight @ 1 hr | 16.619 | 16.554 | 16.479 |
| 1 hr loss | 0.011 | 0.004 | 0.001 |
| Weight @ 2 hrs | 16.607 | 16.55 | 16.478 |
| 2 hr loss | 0.023 | 0.008 | 0.002 |
| Average loss/hr | 0.0115 | 0.004 | 0.001 |

Example 3

Test Objective

Determine whether an additional prototype will payout fluid at a rate similar to the dispenser of Example 1 under similar conditions.

Prototype Description:

A prototype similar to that described in Example 1 was used. The device was filled with approximately 8 cc of spinosad formulation M08-AH00277-7-1 (lot X-51908) and weight was recorded.

Test Apparatus:

Ohaus Explorer Pro analytical balance

Aircom mechanical cow ear

Observation Method:

The device was attached to the mechanical cow ear and allowed to run at an approximate rate of one cycle per 7 seconds. Each cycle consists of the ear flicking backward and making momentary contact with the faux fur. The device was weighed hourly and weights were recorded. The mechanical ear was moved to a clean patch of faux fur at each hour.

Observations:

After one hour of cycling, there was visible evidence of the spinosad formulation on the faux fur. The odor of the formulation could also be detected on the faux fur. Results are recorded in Table 3, below.

TABLE 3

| Weight Loss Results | | |
|---|---|---|
| | Device weight (grams) Day 1 | Device weight (grams) Day 6 |
| Start weight | 16.712 | 16.473 |
| Weight @1 hr | 16.704 | 16.463 |
| 1 hr loss | 0.008 | 0.01 |
| Weight @ 2 hrs | 16.693 | 16.452 |
| 2 hr loss | 0.019 | 0.021 |
| Weight @ 3 hrs | 16.685 | 16.438 |
| 3 hr loss | 0.027 | 0.035 |
| Weight @ 4 hrs | 16.676 | 16.424 |
| 4 hr loss | 0.036 | 0.049 |
| Weight @ 5 hrs | 16.657 | 13.33 |
| 5 hr loss | 0.055 | 0.067 |
| Average loss/hr | 0.011 | 0.0134 |

Example 4

Test Objective

Determine if elevated temperature causes spinosad formulation to leak from the dispenser in droplet form. (Weight loss due to evaporation was not considered in this test.)

Prototype Description:

The prototype was similar to that described in Example 1. The dispenser was filled with approximately 8 cc of spinosad formulation M08-AH00277-7-1 (lot X-51908) and weight was recorded.

Test Apparatus:

VWR model 1410 vacuum chamber/oven

Observation Method:

The dispenser was placed in a vertical orientation inside the oven and the oven temperature was set to 50° C. A polished stainless steel slide was placed below the device to help identify any potential dripping. The device was observed for 24 hours.

Observations:

The device was visually checked several times over the course of 24 hours. No dripping was observed. In addition, drops did not form on the end of the wick nor at the bottom of the reservoir. The dispenser appeared to retain all the liquid. At the end of the test, the dispenser was removed from the oven and tested on a piece of paper to determine if the wick had dried out. Initially, the wick felt a bit dry as it was applied to the paper. However, after minimal contact with the paper, the dispenser began to pay out liquid to the paper.

While a preferred embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dispenser, comprising:
   a shell having an opening;
   means for attaching the dispenser to an animal;
   a reservoir disposed in the shell comprising a porous material containing a liquid substance; and
   a wick having a first portion in direct contact with the porous material whereby the wick is in fluid communication with the reservoir and a second portion positioned adjacent the opening, the wick having a greater capillary attraction than the reservoir, whereby during use of the dispenser the wick draws the liquid substance from the reservoir through the first portion of the wick and the second portion of the wick deposits the liquid substance on an animal upon contact and wherein substantially all payout of the liquid substance from the reservoir is delivered by wicking action of the wick and through the opening.

2. The dispenser of claim 1, wherein the wick has a greater density than the reservoir.

3. The dispenser of claim 1, wherein the wick is comprised of a different material than the reservoir.

4. The dispenser of claim 1, wherein the wick has a smaller pore size than the reservoir.

5. The dispenser of claim 1, wherein the reservoir is comprised of a material that retains the liquid substance through capillary forces.

6. The dispenser of claim 1, wherein the wick and the reservoir are comprised of the same material.

7. The dispenser of claim 1, wherein the shell comprises a sleeve that exerts a compressive force on the wick, whereby the compressive force increases the wick's capillary attraction.

8. The dispenser of claim 1, wherein the wick protrudes from the opening.

9. The dispenser of claim 1, wherein the wick is substantially flush with the opening.

10. The dispenser of claim 1, wherein the shell comprises a sleeve which defines the opening, the wick being disposed in the sleeve.

11. The dispenser of claim 10, wherein the wick is substantially flush with the opening.

12. The dispenser of claim 10, wherein the wick protrudes from the opening.

13. The dispenser of claim 10, further comprising a skirt extending from the shell, the skirt at least partially surrounding the sleeve.

14. The dispenser of claim 1, wherein the wick and reservoir comprise a unitary material.

15. The dispenser of claim 1, wherein the liquid substance is selected from the group consisting of medicaments, growth hormones, therapeutic agents, drugs, repellants, pheromones, pesticides, insecticides, scents, and combinations thereof.

16. The dispenser of claim 1, wherein the attachment means comprises a flexible grommet.

17. The dispenser of claim 16, wherein the shell is substantially rigid.

18. The dispenser of claim 1, wherein the substance is substantially nonvolatile.

19. The dispenser of claim 18, wherein the substance is a pesticide.

20. The dispenser of claim 19, wherein the pesticide is selected from the group consisting of spinosad lambdacyhalothrin, gamma-cyhalothrin, diazinon, coumaphos, cyfluthrin, and combinations thereof.

21. The dispenser of claim 1, further comprising a vent that allows air to enter the dispenser as the liquid substance is dispensed.

22. The dispenser of claim 1, further comprising a plurality of ribs extending interiorly from the shell, the ribs supporting the reservoir within the shell.

23. The dispenser of claim 22, further comprising a void between the reservoir and the shell.

24. The dispenser of claim 23, wherein the void comprises a plurality of voids.

25. The dispenser of claim 22, wherein at least one of the ribs of the plurality of ribs comprises a venting channel.

26. The dispenser of claim 22, wherein the plurality of ribs comprises at least two spaced ribs, each of the spaced ribs having a venting channel, the venting channels being aligned.

27. The dispenser of claim 1, wherein the shell comprises a substantially cylindrical shape.

28. The dispenser of claim 1, further comprising a cap attached to the shell.

29. The dispenser of claim 28, further comprising a ring that circumscribes the shell and attaches the cap thereto.

30. The dispenser of claim 28, wherein the cap comprises a plurality of ribs extending therefrom, the ribs supporting the reservoir within the shell.

31. The dispenser of claim 1, wherein the dispenser when full weighs no more than about 30 g.

32. The dispenser of claim 1, wherein the wick comprises polyolefin.

33. The dispenser of claim 1, wherein the reservoir comprises an acetal copolymer.

34. The dispenser of claim 1, wherein:
the liquid substance comprises two different liquids, the reservoir comprises two reservoirs, the shell defines a divider that separates the two reservoirs, each reservoir being saturated with a respective one of the substances; and
the wick comprises two wicks, each wick being in fluid communication with a respective one of the reservoirs.

35. The dispenser of claim 34, wherein one of the liquid substances comprises a pesticide.

36. The dispenser of claim 1, wherein the rate of dose delivery by the wick is substantially independent of the amount of liquid substance contained in the reservoir.

37. A pesticide dispenser for dispensing pesticide on an animal, comprising:
a shell having an attachment member adapted for attaching the dispenser to the animal, the shell defining an opening;
a reservoir disposed in the shell, the reservoir comprising a porous material that contains the pesticide; and
a wick having a first portion in direct contact with the porous material whereby the wick is in fluid communication with the reservoir and a second portion positioned adjacent the opening, the wick having a greater capillary attraction than the reservoir and wherein substantially all payout of the pesticide from the reservoir is delivered by wicking action of the wick and through the opening;
wherein the rate of dose delivery from the wick remains substantially constant as the supply of the pesticide within the dispenser is depleted.

38. The pesticide dispenser of claim 37, further comprising a sleeve extending therefrom and terminating in the opening.

39. The pesticide dispenser of claim 38, further comprising a skirt extending from the shell, the skirt at least partially surrounding the sleeve.

40. The pesticide dispenser of claim 37, wherein the wick and reservoir comprise a unitary material.

41. The pesticide dispenser of claim 37, wherein the wick is in abutting relationship with the reservoir.

42. The pesticide dispenser of claim 37, wherein the pesticide is substantially nonvolatile.

43. The pesticide dispenser of claim 37, further comprising a vent that allows air to enter the dispenser as pesticide is dispensed.

44. The pesticide dispenser of claim 37, further comprising a plurality of ribs extending interiorly of the shell, the ribs supporting the reservoir within the shell.

45. The pesticide dispenser of claim 37, further comprising a void between the reservoir and the shell.

46. The pesticide dispenser of claim 45, wherein the void comprises a plurality of voids.

47. The pesticide dispenser of claim 37, further comprising a plurality of ribs extending inwardly from the shell and supporting the reservoir, at least two ribs of the plurality of ribs having aligned venting channels.

48. The pesticide dispenser of claim 37, wherein the shell comprises a substantially cylindrical shape.

49. The pesticide dispenser of claim 37, further comprising a cap attached to the shell.

50. The pesticide dispenser of claim 49, further comprising a ring that circumscribes the shell and attaches the cap thereto.

51. The pesticide dispenser of claim 49, wherein the cap comprises a plurality of ribs extending therefrom, the ribs abutting the reservoir.

52. The pesticide dispenser of claim 37, wherein the wick comprises polyolefin.

53. The pesticide dispenser of claim 37, wherein the reservoir comprises an acetal copolymer.

* * * * *